United States Patent [19]
Eselun

[11] Patent Number: 5,909,283
[45] Date of Patent: Jun. 1, 1999

[54] LINEAR ENCODER USING DIVERGING LIGHT BEAM DIFFRACTION

[76] Inventor: Steven Albert Eselun, 1240 12th St., Los Osos, Calif. 93402

[21] Appl. No.: 08/946,605

[22] Filed: Oct. 7, 1997

[51] Int. Cl.$^6$ ..................................................... G01B 9/02
[52] U.S. Cl. ............................................................ 356/356
[58] Field of Search ........................ 356/356; 250/237 G, 250/231.14

[56] References Cited

U.S. PATENT DOCUMENTS

| | | | |
|---|---|---|---|
| 5,355,220 | 10/1994 | Kobayashi | 356/356 |
| 5,486,923 | 1/1996 | Mitchell | 356/356 |
| 5,559,600 | 9/1996 | Mitchell | 318/356 |
| 5,621,527 | 4/1997 | Kaneda et al. | 356/356 |

FOREIGN PATENT DOCUMENTS 0215917  9/1988  Japan ..................................... 356/356

*Primary Examiner*—Samuel A. Turner
*Attorney, Agent, or Firm*—Robert Samuel Smith

[57] ABSTRACT

A linear encoder characterized as having a few number of parts including a light source that directs a beam of light onto the grating of a movable scale where reflected diffracted beams from two locations on the scale interfere with one another to form light fringe bands on a plane. In one embodiment, a Ronchi grating is located on the plane having lines with a spacing equal to the spacing of the light fringe bands. The combination of the Ronchi lines and the bands of the fringe pattern form a Moire pattern which is transmitted through the Ronchi grating and whose spatial distribution of intensity moves as the scale is moved and is detected by a photodetector array. The photodetector array converts the signal from the Moire pattern to a sinusoidal expression of displacement whose phase is used to determine displacement of the scale.

11 Claims, 5 Drawing Sheets

LINEAR ENCODER USING DIVERGING LIGHT BEAM DIFFRACTION

FIELD OF THE INVENTION

This invention relates to diffraction linear encoders and particularly to a linear encoder having a grating producing interfering light beams originating from a point source.

BACKGROUND AND INFORMATION DISCLOSURE

A number of apparatuses have been disclosed for measuring displacement which utilize detection of shifts of light fringe patterns of diffracted light.

U.S. Pat. No. 5,355,220 Kobayashi et al discloses a light from a source radiated onto a diffraction grating to generate diffracted lights of different orders of diffraction permitting detection of light and dark stripes. Movement is measured by direct detection of movement of the stripes.

U.S. Pat. No. 5,486,923 to Mitchell et al discloses a grating which concentrates light having a preselected wavelength into + and − first orders while minimizing the zero order. The diffracted orders of light illuminate a polyphase detector plate.

U.S. Pat. No. 5,559,600 discloses a grating concentrating a preselected wavelength into positive and negative first orders. A polyphase periodic detector has it sensing plane spaced from the scale at a location where each detector element responds to the positive and negative first orders without requiring redirection of the diffracted light.

These devices do not provide the inherent precision as can be achieved with the present invention, and are generally expensive where fine resolution is required. The expense is due to the requirement to assemble these parts in precise locations relative to one another.

SUMMARY

It is therefore an object of this invention to provide a linear encoder which is very low cost in terms of a few number of parts and assembly.

This invention is directed toward interfering orders of diffracted light beams generated by a single point light source shining onto a scale (grating). Displacement is measured in terms of the movement of the scale in a direction parallel to the grating surface and relative to a base supporting the point light source. The light beam is preferably generated by a laser and typically diverges 10 degrees in one direction and 30 degrees in the perpendicular direction so that the cross section of the beam is typically oval where the oval beam of light is made up of sections of the light beam. The beam is directed at an angle against the scale so that one section of the beam incident on the scale at a first location is reflection diffracted to produce one set of diffracted beams and another section of the beam incident on the scale at another location produces a second set of diffraction beams. One section of beam is the center section of the beam. Diffracted beams from any one section will intersect diffracted beams of other sections so that if the diffracted beams are incident on a surface, a pattern of light and dark fringes are foiled. A Ronchi grating (or other suitable element) is positioned so that the surface of the grating coincides with a plane in space where the light pattern is an array of straight line fringes where the fringe spacing equals the spacing of the Ronchi grating so that a Moire pattern of light is produced by the combination of the diffracted light beams and the Ronchi grating. When the scale is displaced the Moire pattern is also displaced corresponding to the scale movement. A photo detector array is positioned to receive the Moire pattern of light transmitted through the Ronchi grating and emit a signal corresponding to the Moire pattern of light bands. The photo detector array consists of a plurality of array sets. Each set having a width of one light band width. Each set consists of four detector elements placed side by side so that the intensity of each band is measured at four locations across the band. The spatial intensity of the band is essentially sinusoidal. The detector elements of each set corresponding to the same phase of the sinusoid are all connected together in parallel so that the signal of all the corresponding elements of all the sets are added together. The detector thereby outputs four summation signals responsive respectively to the light intensity at four locations across the breadth of the light fringe band from which the phase of the spatial sinusoidal light band intensity can be calculated so as to relate to movement of the scale.

DESCRIPTION OF THE BEST MODE

Figure 1:
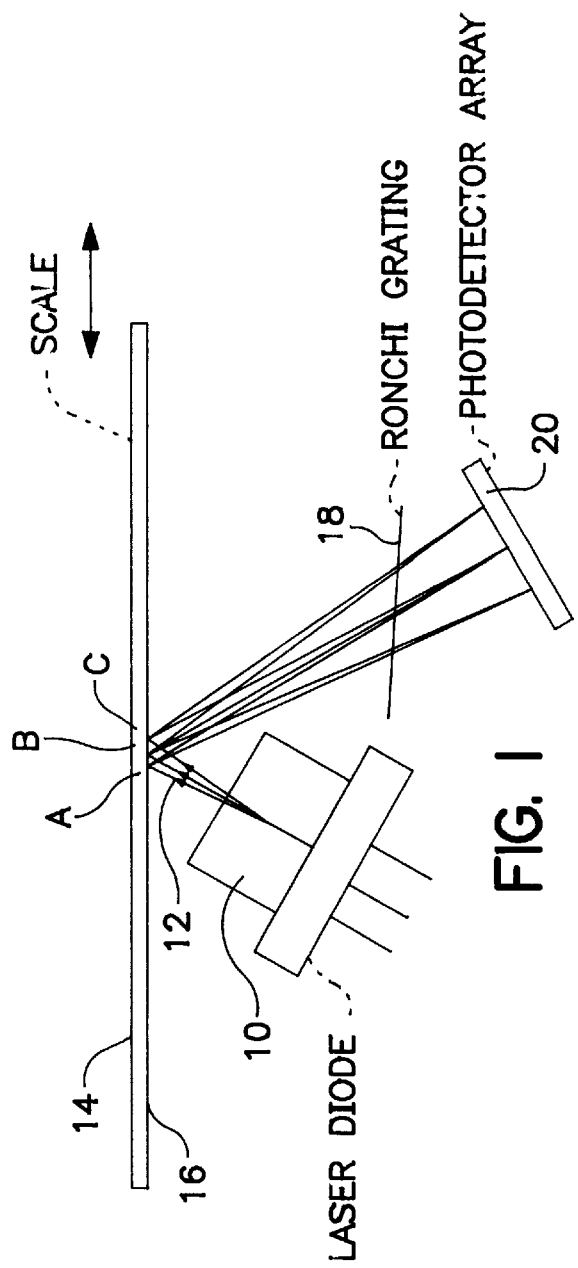
FIG. 1 shows the encoder of this invention with a Ronchi grating.

Turning now to a discussion of the drawings, FIG. 1 shows the linear encoder of this invention including a light source 10 generating a beam 12 of light. The light source 10 is preferably a laser and in these devices the beam diverges and has an oval cross section. Typically, the divergence of the outer boundaries of the beam varies from a minor angle of about ten degrees to a maximum angle of about thirty degrees. The central section of the beam 12 is incident at an angle on the surface of a scale 14. The scale has straight grating lines 16 on its front surface. (perpendicular to the paper). A length of the scale is illuminated by the diverging beam 12, FIG. 1 shows three locations. A, B, C, where a section of the beam is reflected into diffracted beams at each location, A, B, C. The diffracted beams from each location interfere with the diffracted beams of the other locations. The result is that, a pattern of light fringes may be viewed on a viewing (reflecting) surface placed any where in front of the scale. A Ronchi grating 18 is placed at a particular location where the fringe pattern is a plurality of equally spaced straight bands oriented parallel to the lines of the Ronchi grating and the spacing of the bands is equal to the spacing of the lines of the Ronchi grating. The diffracted beams transmitted through the Ronchi grating generates a Moire pattern which is incident on photo detector 20.

In the embodiment of FIG. 1, the Ronchi grating is placed on a plane where equi-spaced parallel fringe bands are generated by interference between zero order and the +first order beam. A moire pattern is generated when the spacing of the lines of the Ronchi grating are identical to the spacing of the light bands. Other, more complicated fringes are passed by the Ronchi grating and are rejected by the detection (electronic) means discussed below.

Equi spaced parallel fringe bands could also be generated at a different angle of the Ronchi grating by interfering the zero order with the −first order diffraction beam. However, one Ronchi grating could not be used to "beat out" light from both the +1 order with zero order and −1 order with zero order simultaneously.

Figure 2:
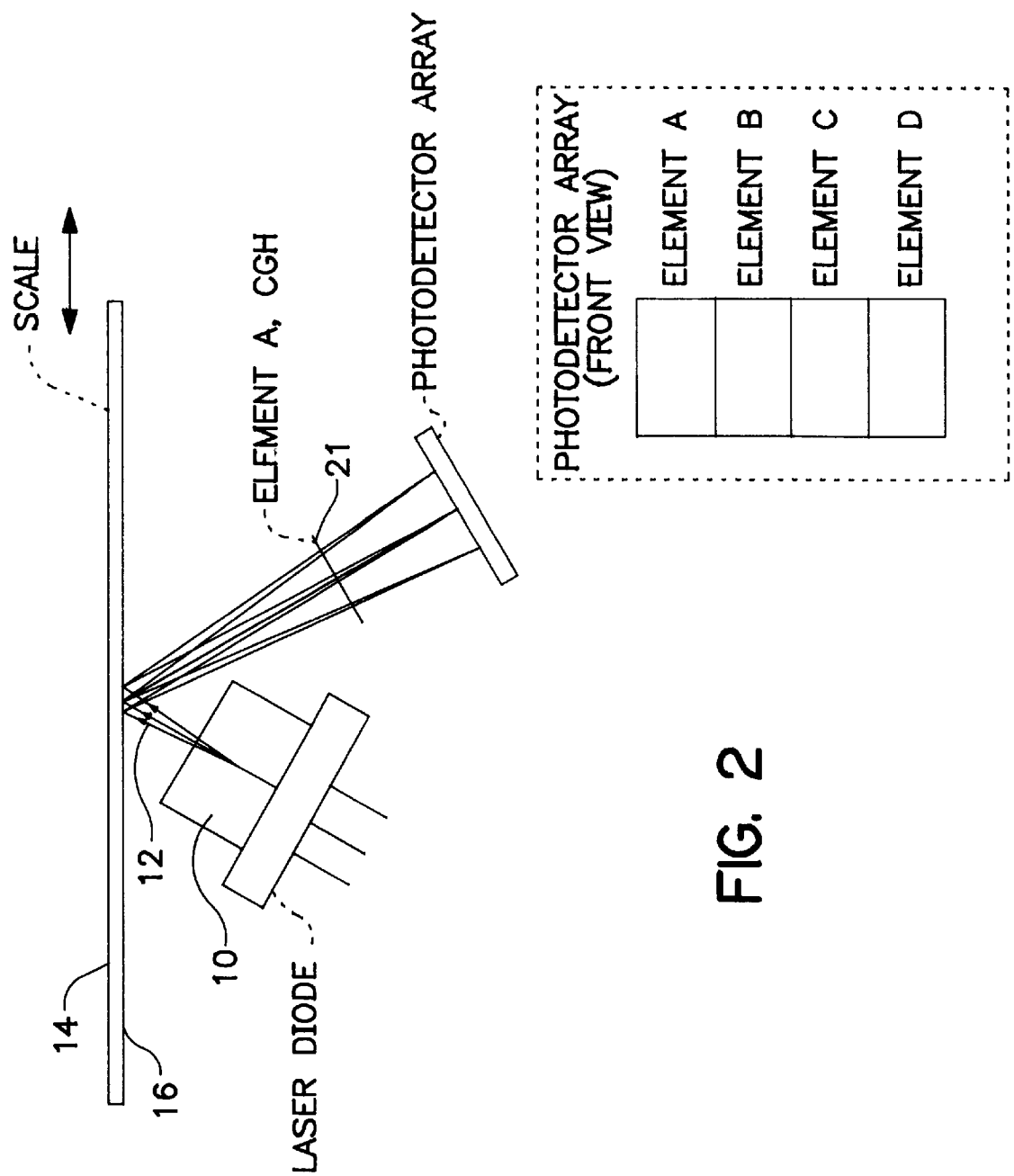
FIG. 2 shows the encoder of this invention with a hologram.

FIG. 2 shows an embodiment of the invention where one optical element in place of a Ronchi grating can be used to "beat out" light from both the +1 order with zero order and −1 order with zero order simultaneously. According to this embodiment, the Ronchi grating of FIG. 1 is replaced by a hologram 21 which is generated computationally. The hologram 21 has chrome-on-glass pattern deposited to precisely match the pattern produced by interfering a portion of the zero order beam (light half) with the +1 diffracted order and another potion of the zero order beam (left half) with the −1 diffracted order beam. This pattern may be computed at any desired orientation angle of the hologram.

With the hologram element in place, when the scale moves one cycle, the moire pattern moves one cycle. The arrangement using the hologram uses at least twice the light as the arrangement using the Ronchi grating.

In computing the the fringe pattern for the hologram element, the relative phase difference between between the two beams arises from two sources. One source is the differing geometrical path that each beam traverses prior to impinging on the hologram element and the other is the phase change each beam undergoes by diffracting from the grating. That is, each beam is diffracted from a different position on the grating and therefore has a different phase.

In general, the lines of the hologram element have a variable spacing and are curved from top to bottom (into and out of the paper). The lack of symmetry of the hologram element means that it must be located precisely in the optical path.

The embodiment of FIG. 2 incorporating the hologram element has the advantage over the embodiment of FIG. 1 incorporating the Ronchi grating that it is possible to use more than twice the amount of available light.

Figure 3A:
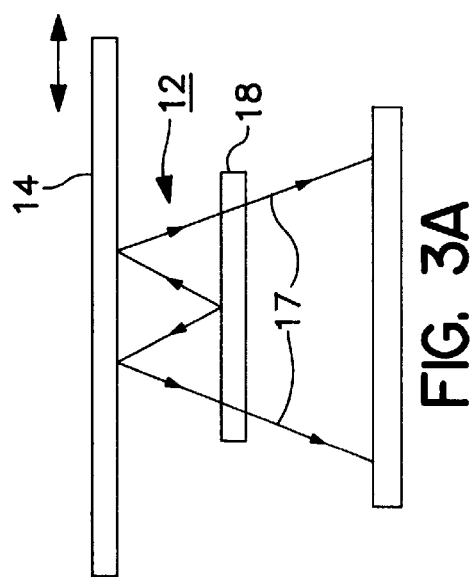
FIGS. 3A and 3B are front and side views respectively showing the encoder with the light source and Ronchi grating equispaced from the scale.
Figure 3B:
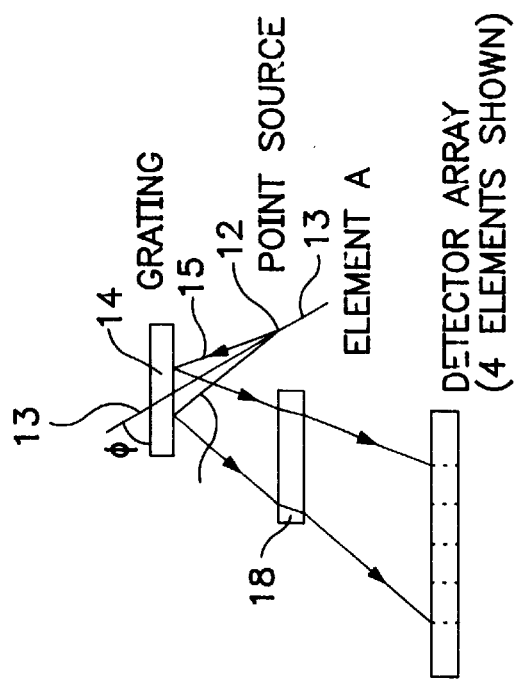

FIGS. 3A (front view) and 3B (end view) show an embodiment in which a Ronchi grating 18 is used to form the Moire pattern with the scale 14 and the point source of light (the laser 10) in the same plane as the Ronchi grating 18. As shown in FIG. 3B, the central angle of incidence is not in the plane of diffraction. The plane of diffraction is perpendicular to the scale 14. The scale lines come out of the paper in FIG. 3A.) The laser beam direction is oriented such that the boundaries 15A and 15B of the beam having minimal divergence form a plane parallel to the scale lines as shown in FIG. 3B and the boundaries 12A and 12B of the beam having maximal divergence form a plane that is oblique to the scale lines as shown in FIG. 3A. Then on this plane containing both the Ronchi grating and the point source 18, the interference of the +1 order with the −1 order produces straight lines having the same spacing as the scale spacing. The fringes are everywhere straight and parallel to the scale lines. The central section of the laser beam can be directed at a convenient angle to illuminate any portion of this infinite plane. The geometrical path difference between the interfering beams is everywhere zero on this plane and the Ronchi grating can be placed anywhere that is convenient. Furthermore, the Moire pattern will be displaced one cycle when the scale is displaced by just one half the grating spacing, thereby doubling the resolution over FIGS. 1 and 2.

Figure 7:
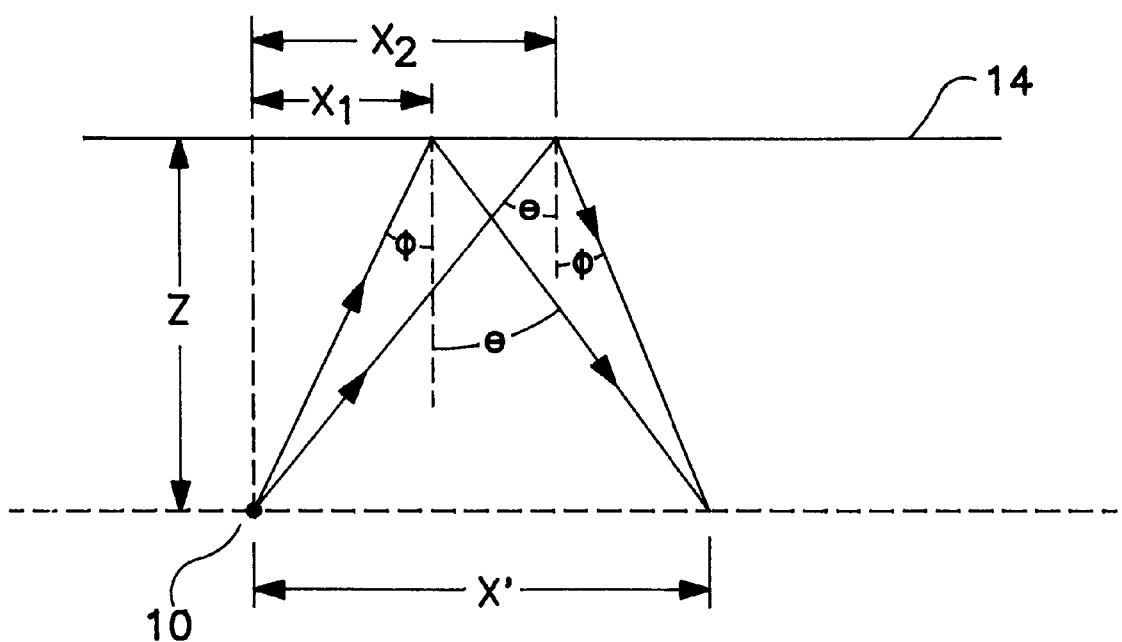
FIG. 7 shows conversion of two reflected beams.

FIG. 7, illustrates the geometry of the interfering beams. The two light beams leave the point source 10 in phase and arrive again at the point x' after taking different routes. Each route is exactly the same distance but each beam undergoes a different phase shift upon diffraction at scal 14 resulting in a phase difference at x'. The following discussion shows how this phase difference changes as x' is changed.

Let x be the position along the scale 14 and x' is the position along the plane containing the point surce 10 in the plane of diffraction. At any x', the −n order diffracted beam comes from a position $x_2$ on the scale, and the +n order comes from a position $x_1$. Suppose that the scale and source plane are a distance z apart. Then $$x' = z[\tan(\theta) + \tan(\emptyset)]$$

The diffraction equation gives also $$\sin(\theta) - \sin(\emptyset) = n\lambda/s$$

where s is the scale spacing.

For any x', one may compute a θ and ∅ satisfying these two equations. With that θ and ∅, one may then find the phase difference at x' due to the separation $x_2 - x_1$ as $$2\pi n z [\tan(\theta) - \tan(\emptyset)]/s$$

It an be demonstrated that this phase is only a linear function of x', giving rise to the uniform fringe pattern on this plane containing the source 10.

These equations apply in the direction in and out of the paper because the geometrical paths of each beam are still identical. This is true only on this special plane. Therefore, the fringes are uniformly spaced along x', and are precisely straight up and down. For n=1, they "mirror" the scale lines but they move through the beam at two cycles for every one cycle of scale movement.

Besides simplicity, there are two major advantages of this arrangement.

One is that small wavelength variations of the laser never affect the eventual position measurement. This is because the path length difference of the interfering beams is zero.

The second advantage is the very large tolerance to grating runout. As the laser 10 and Ronchi grating 18 are rigidly mounted on the same base, a change in the laser scale distance equals the change in the scale-Ronchi grating spacing. The phase and spacing of the interference pattern remains unchanged. The Moire pattern may strike the detector at a different location but the phase remains fixed.

Position sensing is therefore completely unaffected by laser wavelength or scale runout.

The detected phase of the Moire pattern is governed only by the lateral position of the grating and the Ronchi grating. The apparatus is extremly simple and compact. No beam shaping of the laser is required. We have only a laser diode, Ronchi grating and photodetector. Each of the embodiments can also be constructed in transmission. However, reflection is preferable because it is more convenient to incorporate on a moving stage and the tolerance to runout does not apply in arrangements involving transmission.

Figure 4:
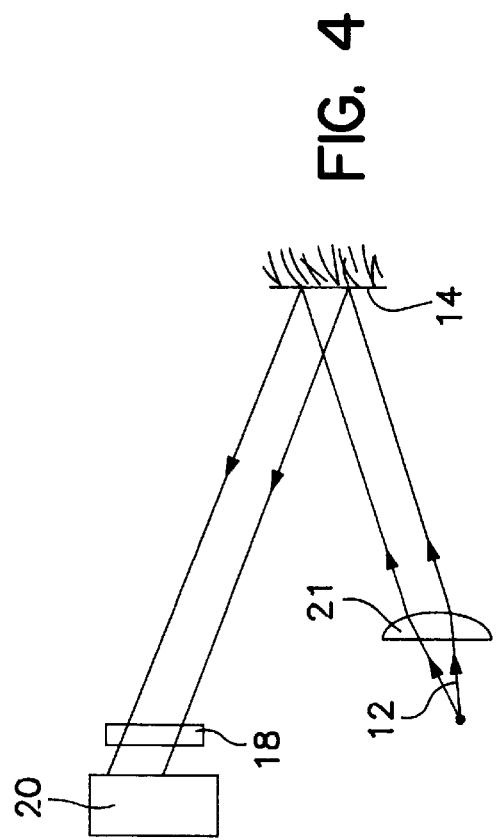
FIG. 4 shows the encoder with a cylindrical lens.

FIG. 4 shows another embodiment in which a cylindrical lens 21 is placed in the path of beam 12 with the non-active axis of the lens parallel to to the direction of motion of the moving scale. This allows the read head, comprised of every thing except the the scale, to be placed at a larger distance from the scale while still retaining a small beam size (parallel to the scale lines at the scale. A smaller beam at this point allows a greater overall overall tolerance to pitch rotations of the moving scale.

Figure 5:
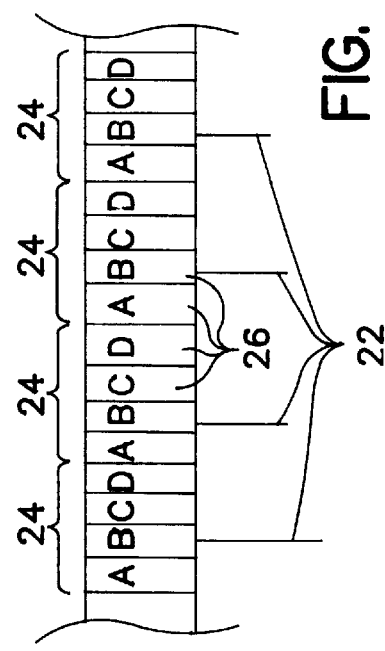
FIG. 5 shows the photodetector having sections spanning a fringe band and elements within each section.

FIG. 5 shows the arrangement of the photodetector 20. The edges 22 of foul bands of the Moire pattern are shown. The photo detector 20 comprises sets 24 of detector elements 26, each set 24 being four elements 26. Each set has a width of one spatial period of the moire pattern and so the four signals, one from each element of the set, indicates the intensity at foul points across one band of the moire pattern. All of the corresponding elements of the sets are connected in parallel so that four summation signals, $S_a$, $S_b$, $S_c$, $S_d$, are generated corresponding to four locations across the Moire band.

Figure 6:
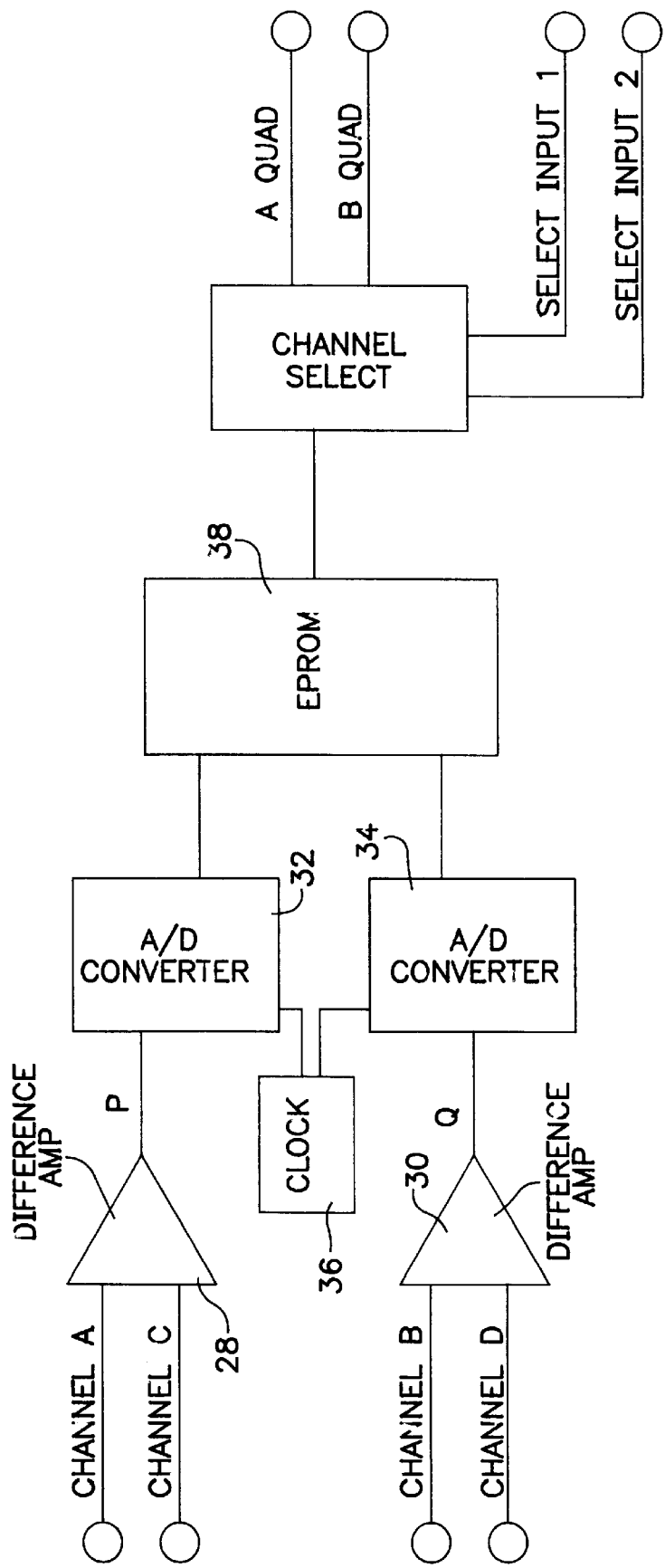
FIG. 6 shows a circuit for processing the photocurrents.

FIG. 6 shows a circuit for processing the foul signals. The variation of intensity across the Moire band is substantially sinusoidal. Difference amplifiers 28 and 30 form difference signals, P and Q respectively where:

$$P=S_a-S_c$$

and $$Q=S_b-S_d$$

This technique rejects or limits many spatial frequencies incident on the array 20 including DC light (spatially even illumination).

Sine and cosine signals are formed where:

$$P(x)=P \cos(4\pi nx/s)$$

and $$Q(x)=Q \sin(4\pi nx/s)$$

x is the position of the scale 14 and s is the grating spacing and n is the diffraction order. Orders higher than n=1 can be used with increasing resolution and decreasing signal strength.

A suitable rotation of the Ronchi grating 18 allows one to align the Moire fringes with the elements of the photodetector array 20 and to adjust their spacing to match each set of four array elements.

The P and Q signals are converted to binary form by A/D converters 34, and 36 and presented as an address location to EPROM 38. Analog/Digital conversion is performed continuously by clock 36.

Digital interpolation of the sine/cosine signals is useful. The enclosed schematic of FIG. 6 has very few components and can be housed with the laser drive circuitry in a very small package. The phase angle in the range 0 to 360 degrees is divided into N equal regions, independent of radius. Starting at phase angle equal to 0 to 360/N, the EPROM is programmed with 00. The next region is programmed with 01, 11, 10. This sequence is repeated N/4 times around the circle. This is the basic quadrature sequence. (Absolute phase angle could similarly be programmed in an EPROM. Many EPROM's are 8 bits wide so four separate quadrature output channels arc easily feasible. We could have N=8, 80, 160, 256 as an example, and the user could use the SELECT INPUTS to choose whichever interpolation value is desired. The digital quadrature outputs are then counted separately. Their state change will always be accurate as long as the velocity of the scale (in counts per sec) is less than the conversion time of the A/D converters which is set by the particular devices used.

EXAMPLE

Scale=8 micron chrome on glass
Laser=785 nm diode laser

Input beam angle=30 degrees
Distance from laser to scale 0.125 inches
Distance from scale to Ronchi grating=0.125 inches
Diffraction order=1
Ronchi line spacing=8 microns
Signal period=4 microns
Overall array detector dimensions=0.10×0.30 inches
A/D converters=8 bit, i Mhz
EPROM=64k by 8
N=8, 80, 160, 256
Resolution (microns)=0.5, 0.05, 0.025, 0.0156 micron. The read head can easily be housed in a package less than 0.75×0.75×0.50 inches. The electronics can also be configured in a very small package with off the shelf components.

A major feature of this invention is the use of a point source of light directing a beam at an angle onto a movable scale. Diffraction beams are generated which are intersected by an optical component such as a Ronchi grating so as to form Moire fringe bands. An array of sets of photodetectors are positioned to intercept the bands of the Moire pattern and emit signals that are electronically processed to indicate displacement of the scale. The device is characterized by few parts capable of rigid assembly so that the device may be economically produced. Variations and modifications of the principles of the invention may be suggested by reading the specification and studying the drawings which are within the scope of the invention. I therefore wish to define the scope of my invention by the claims.

I claim:

1. A lineal encoder utilizing optical interference independent of wavelength for measuring displacement in a direction of a first base relative to a second base which comprises:

a scale mounted on said first base with a flat surface parallel to said direction and having a row of lines parallel to one another and perpendicular to said direction;

said scale being opaque and said diffracted beams are reflected from said opaque scale to said optical element positioned on a same side of said scale as said light source;

a light source means which is effectively a point light source for directing a diverging beam of light onto said surface of said scale whereby a plurality of sections of said beam are incident on a plurality of locations of said surface respectively providing that each said section of beam is reflected from its respective location as a plurality of orders of diffracted beams and providing that any one said reflected order of any one of said diffracted beam will interfere with at least one order of another said diffracted beam;

a Ronchi rating having a surface coincident with a surface in space wherein a selected order of said diffracted beams from one section of said beam interfering with a selected order of said diffracted beam from another section of said section of said beam forms a series of parallel light fringe bands;

said surface of said Ronchi grating having Ronchi grating lines parallel to one another and parallel to said light fringe bands and said Ronchi grating lines spaced from one another by a distance equal to the spacing of said parallel fringe bands;

said surface of said Ronchi grating being coincident with a plane parallel to said surface of said scale and spaced at a distance from said scale equal to a distance of said scale from said light source whereby said Ronchi grating, in operable combination with said scale and said light source means generates a Moire pattern of light fringe bands providing that position sensing is independent of wavelength of said optical source and runout of said scale.

2. The encoder of claim 1 wherein said light source means comprises a laser.

3. The encoder of claim 2 wherein said laser emits a beam having a divergence of at least thirty degrees.

4. The encoder of claim 1 which comprises a cylindrical lens placed in the beam path between the light source and the scale with an axis of said cylindrical lens parallel to grating lines of said scale.

5. The encoder of claim 1 wherein said Ronchi grating has a hologram surface developed at a location where a right half portion of a zero order diffracted beam from one beam section interferes with a $+n^{th}$ order diffracted beam of another beam section and a left half portion of said zero order diffraction beam from said one beam section interferes with a $-n^{th}$ order diffracted beam of said another beam section.

6. The encoder of claim 1 wherein said photodetector array means comprises:
   a first plurality of sections of photodetector sets arranged in a row, side by side;
   each said set having a second plurality of photodetector elements arranged in a row, side by side between neighboring sets;
   each set having a width substantially equal to a width of of said light fringe band of said Moire pattern and each set arrange to enable each photodetector element of said respective set to emit a photocurrent responsive to light intensity at one of a second plurality of domains across a width of one of said light fringe bands;
   means for emitting a composite signal responsive to said photocurrent from all of said second plurality of domains, said composite signal being a collection of all the individual signals from all said photodetector elements.

7. The encoder of claim 6 wherein all of said photodetector elements occupying corresponding domains within their respective bands are connected in parallel so that said composite signal has a second plurality of signal components wherein each signal component is a sum of all the photocurrents from corresponding locations of all of the Moire light fringe bands.

8. The encoder of claim 7 wherein an amplitude of said composite signal has a sinusoidal form representing sinusoidal variation of intensity from one edge of each said band to an opposite edge, and providing that a phase angle of said composite signal is provided whose magnitude represents displacement of said scale.

9. The encoder of claim 8 which comprises means for expressing said phase angle as a cosine and sine of said phase angle and applying measurements of said phase angle to determine positive and negative directions of motion of said scale.

10. The encoder of claim 9 wherein said second plurality of domains is four whereby first, second, third and fourth photodetector elements are defined and said means for expressing and determining comprises:
    a first difference amplifier means for providing a first difference signal equal to a difference between signals from said first and third photodetector elements;
    a second difference amplifier means for computing a second difference equal to a difference between signals from said second and fourth photodetector elements;
    a first A/D converter means for converting said first difference signal to a first digital signal;
    a second A/D converter means for converting said second difference signal to a second digital signal;
    an EEPROM means have in a lookup table for applying said first and second digital signals to outputting a phase displacement value;
    channel select means for outputting said phase displacement value to one of a first quad and a second quad in accordance with selection of a first and second input signal respectively.

11. A linear encoder for measuring displacement in a direction of a first base relative to a second base which comprises:
    a scale mounted on said first base with a flat surface parallel to said direction and having a row of lines parallel to one another and perpendicular to said direction;
    a laser directing a diverging beam of light onto said surface of said scale whereby a plurality of sections of said beam are incident on a plurality of locations of said surface respectively providing that each said section of beam is reflected from its respective location as a plurality of orders of diffracted beams and providing that any one said reflected order of any one of said diffracted beam will interfere with at least one order of another said diffracted beam;
    an optical component for generating Moire pattern in combination with said scale and light source, said component being one of:
    (i) a Ronchi grating having a surface coincident with a surface in space wherein a selected order of said diffracted beams from one section of said beam interfering with a selected order of said diffracted beam from another section of said section of said beam forms said series of parallel light fringe bands and wherein said surface of said Ronchi grating having Ronchi grating lines parallel to one another and parallel to said light fringe bands and said Ronchi grating lines spaced from one another by a distance equal to a width of each one of said parallel fringe bands;
    (ii) a base having a hologram surface developed at a location where a right half portion of a zero order diffracted beam from one beam section interferes with a $+n^{th}$ order diffracted beam of another beam section and a left half portion of said zero order diffraction beam from said one beam section interferes with a $-n^{th}$ order diffracted beam of said another beam section;
    a photodetector array means arranged to intercept said Moire pattern of light fringe bands for indicating position of said Moire pattern;
    said photodetector array means, said optical component means and said light source means all being mounted on said second base.

* * * * *